United States Patent [19]
Lassiter

[11] 3,853,351
[45] Dec. 10, 1974

[54] MOTORCYCLE BACKREST

[76] Inventor: Wilbert A. Lassiter, 835 S. Frederick St., Apt. 632B, Arlington, Va. 22204

[22] Filed: Mar. 29, 1974

[21] Appl. No.: 456,249

[52] U.S. Cl.................... 297/452, 297/92, 297/195, 297/353, 297/DIG. 9
[51] Int. Cl............................ A47c 7/02, B62j 1/28
[58] Field of Search .......... 297/353, 314, 219, 383, 297/195, 243, 92, DIG. 9, 397, 452; 248/299, 118; 280/202, 289

[56] References Cited
UNITED STATES PATENTS

| 120,485 | 10/1971 | Bowdish | 297/353 |
|---|---|---|---|
| 1,216,029 | 2/1917 | Whitaker | 297/243 |
| 1,240,587 | 9/1917 | Mesinger | 297/DIG. 9 |
| 3,223,447 | 12/1965 | Terracini | 297/397 |
| 3,425,745 | 2/1969 | Michels | 297/195 |
| 3,698,762 | 10/1972 | Gorman | 297/DIG. 9 |
| 3,741,596 | 6/1973 | Cate | 297/DIG. 9 |
| 3,765,639 | 10/1973 | Ewoldt | 297/219 |

FOREIGN PATENTS OR APPLICATIONS

| 1,027,919 | 2/1953 | France | 297/DIG. 9 |

*Primary Examiner*—James T. McCall
*Attorney, Agent, or Firm*—J. Gibson Semmes

[57] ABSTRACT

An adjustable backrest for motorcycles which comprises a moveably mounted backrest cushion and a vertically adjustable headrest cushion, both of which attach to a frame adapted for attachment to a motorcycle saddle or frame, thereby providing increased comfort for the rider on the road and improved protection to the back, neck and head under accident conditions.

3 Claims, 5 Drawing Figures

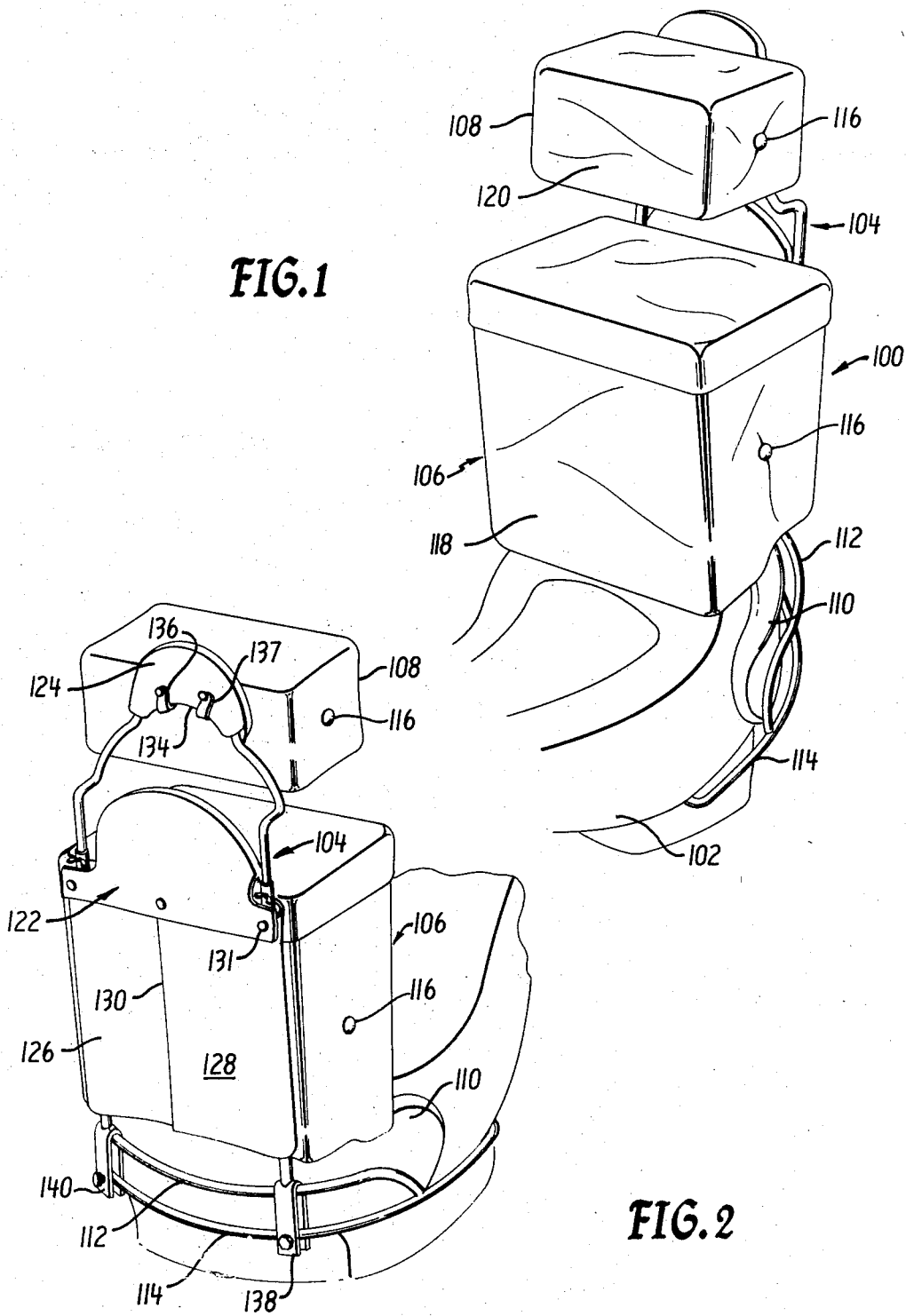

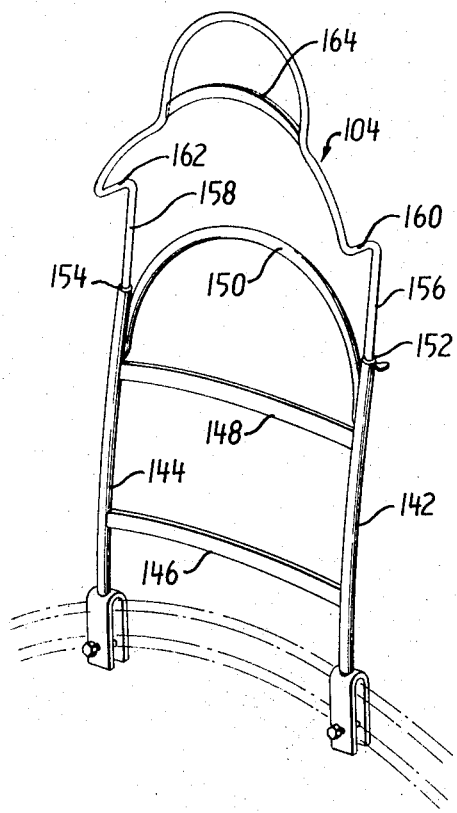
FIG. 3
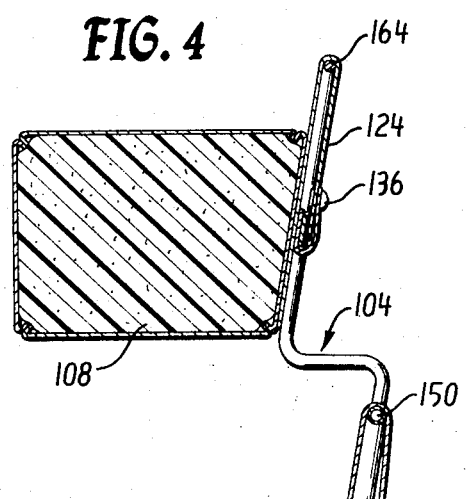
FIG. 4
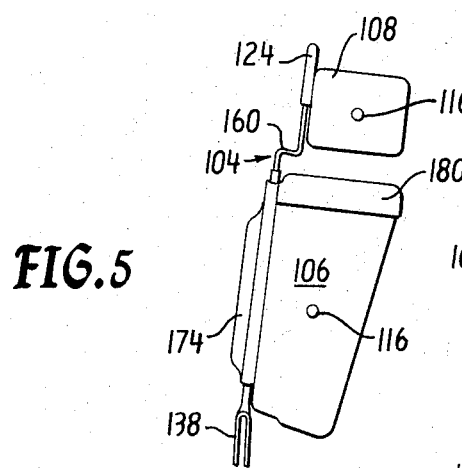
FIG. 5
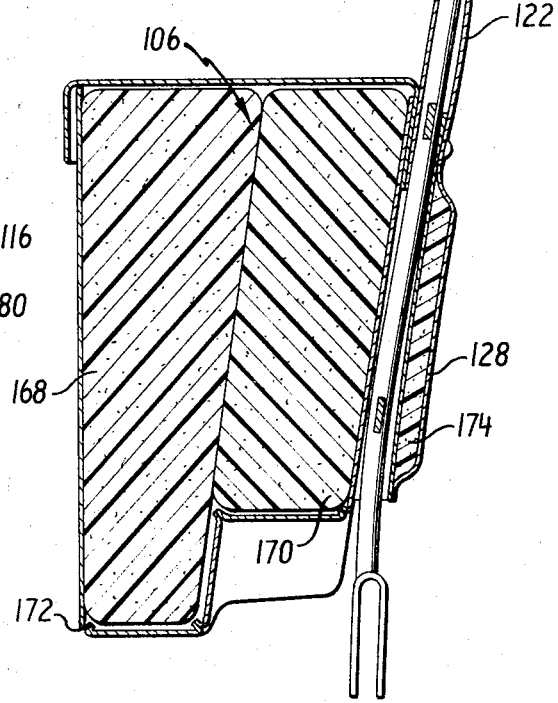

MOTORCYCLE BACKREST

DESCRIPTION OF THE PRIOR ART

Motorcycling and bicycling enthusiasts and manufacturers have for many years sought improved means for increasing rider comfort in motion and decreasing danger to the rider in event of an accident. Thus, Friel's U.S. Pat. No. 1,168,253 shows a backrest appliance for motorcycle saddles in which a spring mounted cushion is restrained against vertical and rocking motion by interaction with the shock support springs of the motorcycle saddle. Weed's U.S. Pat. No. 1,190,828 shows a rigidly mounted bicycle backrest which may be swung into and out of operative positon at the choice of the rider. Whitaker discloses in U.S. Pat. No. 1,216,029 a convertible seat and backrest for a motorcycle which provides a rigid backrest for a solo rider in one position and a pillion and backrest for a passenger rider in another, there being also some vertical adjustability.

More recent attempts at improved motorcycle seats are shown in U.S. Pat. No. 3,269,773 to O'Connor which shows a variety of molded frames with attached cushions which are rigidly attached to the motorcycle frame and may be adapted for either solo or dual riding. Michels discloses in U.S. Pat. No. 3,425,745 an armchair back structure including arm rests, all of which may be attached alternatively to a motorcycle frame or a swivel chair mounting base. McBroom's U.S. Pat. No. 3,549,172 shows a complicated seat and backrest combination for a motorcycle, which provides for solo and dual riding as in Whitaker.

SUMMARY OF THE INVENTION

An object of this invention is to provide an improved motorcycle back and head rest which may be easily attached to and removed from the vehicle; may be simply adjusted to accommodate riders of different sizes or different numbers of riders; will proivide continuous support for the rider's back as the rider moves on the motorcycle saddle; will protect the rider's head, neck and back under accident conditions; and in general will provide a more comfortable, fatigue free support for the rider.

To these ends, the invention provides a rigid, vertically adjustable frame adapted for attachment to the frame of a motorcycle or bicycle saddle or to the frame of the vehicle itself, and a pair of reversibly mounted back and head rest cushions so attached to the frame as to permit them to flex relative to the frame somewhat, thereby following the rider's movements and maintaining supportive contact.

BRIEF DESCRIPTION OF THE DRAWING

FIG. 1 shows a front perspective view of the assembled invention, wherein the headrest has been raised to its maximum height for clarity.

FIG. 2 shows a rear perspective view of the assembled invention, wherein the mode of fastening the head and back rests to the frame of the device may be seen.

FIG. 3 shows a front perspective view of the adjustable frame to which the head and back rests may be attached.

FIG. 4 shows a vertical section through the assembled invention, taken along line 3—3 of FIG. 1.

FIG. 5 shows a side view of the invention wherein the head and back rests have been reversed on the frame of the device to permit dual riding.

DESCRIPTION OF THE PREFERRED EMBODIMENT

FIG. 1 shows the invention 100 as it would appear when mounted to the pivoted spring-cushion saddle 102 of a large touring motorcycle, such as a Harley-Davidson. It will be appreciated, however, that the invention may be mounted to any type of motorcycle, or to a bicycle, irrespective of the type of saddle, by suitable attachment to the saddle or motorcycle frame. A vertically adjustable frame 104 (see FIG. 3) is suitably attached to saddle 102, and carries back rest cushion 106 on its fixed lower portion and headrest cushion 108 on its adjustable upper portion. In this embodiment, the backrest cushion 106 is adapted to fit down over the conventional back brace 110 of saddle 102 and the frame 104 is adapted to be attached to the upper and lower back brace bars 112 and 114 of saddle 102. Both cushions include vent caps 116 to permit explusion of air as the cushions are compressed and to permit the cushions to return to their normal configuration after compression. The front surfaces 118 and 120 of cushions 106 and 108 may be contoured as desired to conform to the individual rider's back and head proportions. As shown more clearly in FIGS. 2 and 4, cushions 106 and 108 have attached to their rear surfaces upwardly extending frame pockets 122 and 124 into which mating portions of frame 104 are inserted during assembly.

FIG. 2 shows a perspective rear view of the assembly shown in FIG. 1. Cushion 106 has attached to its rear surface back flaps 126 and 128 which are wrapped around the vertical elements of frame 104 and secured to each other using a suitable fastener such as a zipper indicated schematically at 130. Flaps 126 and 128 are stretched around frame 104 so as to permit back cushion 106 to move somewhat laterally of the vertical axis of frame 104 and thereby follow the lateral movements of the rider leaning on the cushion. The cushion 106 also tends to compress on the side toward which the rider may lean. Along the upper edge of flaps 126 and 128 are located one part of suitable fasteners such as snaps 131 which mate with the other part of the snaps located on the lower edge 132 of the rear face of frame pocket 122. Thus frame pocket 122 is stretched into fastening position with flaps 126 and 128 to essentially secure backrest cushion 106 from vertical movement on frame 104. Cushion 108 has attached to the lower edge 134 of the rear face of frame pocket 124 one part of suitable fasteners such as snaps 136 which mate with the other part of the snaps 136 located on tabs 137 attached to the back of cushion 108. Thus frame pocket 124 and snaps 136 secure cushion 108 to the adjustable upper portion of frame 104. The entire assembly is mounted to back brace bars 112 and 114 via U-shaped attachment brackets 138 and 140 attached to the lower ends of the side members of frame 104, and suitable bolts through brackets 138 and 140.

FIG. 3 shows a perspecstive view of frame 104 without cushions 106 and 108. It should be noted that frame 104 may be used alone as a backrest for the passenger during dual riding or as an attachment for luggage or similar articles for solo touring. If desired, and upholstered, padded sleeve may be slipped over frame 104. The frame 104 is made of chromium plated steel tubing in the preferred embodiment; however, other rigid materials or bar stock may be used within the spirit of this invention. Vertical sections 142 and 144 are rigidly spaced by upper and lower back cushion support struts 146 and 148 and joined by arcuately shaped section 150 in such a manner as to provide openings at 152 and 154 into which the headrest support sections 156 and 158 may be telescoped or inserted, and adjustably secured by setscrews, not shown. Sections 156 and 158 may be offset at 160, 162 as shown to move the headrest cushion more forward on the device or may extend coaxially with vertical sections 142 and 144. A single headrest support strut 164 arcuately braces sections 156 and 158.

FIG. 4 shows a section through the invention, taken along line 3—3 of FIG. 1, showing the mode of attachment of cushions 106 and 108 to frame 104. Cushion 106 preferably is made in two or more block-like sections 168 and 170 of polyurethane foam or similar material to permit the user to remove a portion of the cushion to accommodate a taller rider or two riders. Of course, cushion 106 may be made of any desired thickness in a single section if adjustability is not required. Cushion sections 168 and 170 may be sculptured as necessary to accommodate the invention to a particular application, as to fit over the back brace 110 discussed with regard to FIG. 1. The cushion may be covered in a suitable upholstery material such as vinyl impregnated canvas, indicated as cover 172. Sewn or riveted to the upper rear portion of cover 172 is frame pocket 122 which is sized to snugly fit over arcuately shaped section 150 as shown. Flaps 126 and 128 are suitably attached to the vertical edges of cover 172 and may be padded as at 174. Flaps 126 and 128 are joined by zipper 130 (FIG. 2) and overlapped by and attached to frame pocket 122 at snaps 131.

Headrest cushion 108 is made of the same materials as cushion 106. Suitably attached to the upper rear portion of cover 176 is frame pocket 124 which is sized to snugly fit over arcuately shaped section 164. The rear section of frame pocket 124 may be padded at 178 (not shown) and includes fasteners 136 along its lower edge, as previously described.

FIG. 5 shows the invention where the backrest cushion 106 has been reversed on frame 104 and the headrest support sections 156 and 158 have been removed from the openings at 152 and 154 and reversed to face the headrest toward the rear of the motorcycle. In this position, the maximum room is provided on saddle 102 for dual riding. Padded portions 174 and 178 face forward and provide some cushioning for the passenger's back or the solo rider's, if the latter is especially tall. When the invention is so arranged, it may be desirable to provide a zippered opening of flap 180 in the top of cushion cover 172 to permit removal of the cushion sections and use of cover 102 as a back pack for luggage or similar material.

In use, the invention provides a more comfortable ride by cradling the rider's back and providing support for the upper back, in addition to the critical lower back or kidney area. During experimental testing of a prototype, it was found that the need for a kidney belt was lessened considerably. Due to the limited lateral movement of backrest cushion 106 permitted by the flaps 126 and 128, the cushion continues to provide this cradling support during all normal sideways and twisting movements by the rider while in motion. Similarly, headrest cushion 108 cradles the back of the rider's head or helmet, thereby relieving neck strain caused by exertion to maintain the head in position against the wind at highway speeds. Both cushions provide needed support to prevent whiplash in the event that the motorcycle is struck from behind in an accident.

Having described my invention in such a manner as to enable one skilled in the art to make and use it, I claim:

1. An operator backrest for a motorcycle saddle comprising:
   A. an elongated rigid backrest frame;
   B. means for attaching one end of said frame to a motorcycle saddle in an essentially vertical orientation relative to the saddle;
   C. a backrest cushion sized to conform to the back of a rider;
   D. said cushion including:
     i. an inner block of resilient material; and
     ii. an outer cover over said inner block;
   E. attachment means for flexibly and reversibly attaching said cushion on said frame including:
     i. a downwardly open frame pocket on the rear surface of said cover engageable over the top of said frame and mounting said cushion on said frame;
     ii. inwardly extending flaps attached to vertical rear side edges of said cover on said inner block engageable around vertically disposed portions of said frame; and
     iii. means securing the inner edges of said flaps one to another for taut and laterally moveable engagement of said cover on said frame; Whereby said back cushion is moveable laterally of said frame to accommodate leaning of a rider on said cushion and said cushion being reversible from front to rear on said frame by reversing the mounting of said attachment means on said frame.

2. An operator backrest as claimed in claim 1, said flap securing means being selectively engageable and disengagable to permit reverse position attachment on said frame, and means for selectively securing the lower edge of said frame pocket to outer surfaces of said flaps.

3. An operator backrest as claimed in claim 2, including:
   A. a second rigid frame element attached as a vertical extension to said elongated backrest frame;
   B. a headrest including an inner resilient block and an outer cover thereover;
   C. attachment means reversibly mounting said headrest on said second frame element including:
     i. a downwardly open frame pocket on the rear surface of said cover engageable over the top of said second frame element;
     ii. tabs on the rear surface of said cover extendible around the second frame top; and
     iii. selectively engageable fasteners for attaching said tabs to said cover and thereby said headrest to said second frame element in forward and reverse positions thereon.

* * * * *